United States Patent [19]
Akagiri et al.

[11] Patent Number: 5,204,677
[45] Date of Patent: Apr. 20, 1993

[54] QUANTIZING ERROR REDUCER FOR AUDIO SIGNAL

[75] Inventors: Kenzo Akagiri; Makoto Akune, both of Tokyo, Japan

[73] Assignee: Sony Corporation, Tokyo, Japan

[21] Appl. No.: 729,388

[22] Filed: Jul. 12, 1991

[30] Foreign Application Priority Data

Jul. 13, 1990 [JP] Japan .............................. P185555/90

[51] Int. Cl.⁵ ............................................. H03M 1/06
[52] U.S. Cl. .................................... 341/118; 341/200; 381/46
[58] Field of Search ............... 341/118, 155, 143, 200; 375/26, 34; 381/46, 23.1

[56] References Cited

U.S. PATENT DOCUMENTS

| | | | |
|---|---|---|---|
| 4,385,393 | 5/1983 | Chaure et al. | 375/30 |
| 5,029,217 | 7/1991 | Chabries et al. | 381/68.2 |
| 5,151,941 | 9/1992 | Nishiguchi et al. | 381/46 |

*Primary Examiner*—A. D. Pellinen
*Assistant Examiner*—Brian K. Young
*Attorney, Agent, or Firm*—Hill, Steadman & Simpson

[57] ABSTRACT

There is provided a quantizing error reducer for an audio signal, which is constructed to feed a quantizing error back to the input side of a quantizer through a noise filter, wherein the coefficient of the noise filter is set on the basis of information relating to the equiloudness curve, thereby making it possible to reduce the noise in the hearing sense.

5 Claims, 10 Drawing Sheets

QUANTIZING ERROR REDUCER FOR AUDIO SIGNAL

BACKGROUND OF THE INVENTION

1. Field of the Invention

This invention relates to a quantizing error reducer for an audio signal, which is constructed to reduce a quantizing error generated in quantization of an audio signal.

2. Description of the Prior Art

At present, as digital audio equipments for handling audio signals in a digital form, there exist, e.g., players for so called compact discs (CD) and/or so called digital audio tape recorders (DATs), etc. In these digital audio equipments, various unified standard requirements are prescribed. For example, in the case of the bit length of digital audio signals handled in these equipments, it is prescribed from the above unified standard requirements that such audio signals have a bit length of 16 bits. Further, as the digital audio signals in these digital audio equipments, there are used digital audio signals obtained by encoding an analog audio signals (sound waveform signals) by using a simple linear quantization like, e.g., so called PCM (linear pulse coding).

Meanwhile, in recent years, in digital audio equipments as described above, it is required from the above-mentioned unified standard requirements that there is provided a reproduced sound having a quantity higher, in view of sense of hearing, than that of a reproduced sound actually obtained. In order that such a reproduced sound more excellent in view of hearing sense is provided, a scheme is conceivable to allow digital audio signals handled in these digital audio equipments to be signals in which noise components included in the digital audio signals themselves are reduced. Reproduced sounds obtained from digital audio signals in which their noise components are reduced in this way have less noise.

As the processing for reducing the noise component of the digital audio signal, there is known, e.g., a processing system to reduce a quantizing error by so called an error feedback to feed a quantizing error (quantizing noise or quantizing distortion) generated by a quantizer in quantizing an audio signal back to the input side of the quantizer through a noise filter.

Here, the quantizing distortion in the linear quantization like the above-described PCM coding has a frequency characteristic flat over the entire frequency band of an audio signal. However, since the ear of the human being has a difference in the hearing sensitivity depending upon a frequency of sound, it cannot be said that the quantizing error reducing processing by the error feedback is necessarily effective in view of hearing sense.

SUMMARY & OBJECTS OF THE INVENTION

This invention has been proposed with the actual circumstances as described in view, and its object is to provide a quantizing error reducer for an audio signal, which is capable of reducing a quantizing error (quantizing noise) effectively from a viewpoint of hearing sense.

A quantizing error reducer according to this invention has been proposed in order to attain the above-described object. In this quantizing error reducer, a quantizing error generated in a quantizer is fed back to the input side of the quantizer through a noise filter. The filter coefficient of the noise filter is set on the basis of information relating to an equi-loudness curve corresponding to the hearing sense characteristic of the human being.

In accordance with this invention, by drawing attention to the fact that the equi-loudness curve is in correspondence with the hearing sense characteristic of the human being, an approach is employed to feed a quantizing error back to the input side of the quantizer through the noise filter of which coefficient is set on the basis of information relating to the equi-loudness curve, thereby making it possible to reduce a quantizing error in a frequency band of a sound easy to be heard. Accordingly, it is possible to reduce noises in the hearing sense thus to improve the dynamic range in the hearing sense.

BRIEF DESCRIPTION OF THE INVENTION

FIG. 1 is a block diagram showing the outline of the configuration of a quantizing error reducer for an audio signal of a first embodiment according to this invention, FIG. 2 is a characteristic diagram showing an equi-loundness curve, FIG. 3 is a characteristic diagram showing a filter characteristic, FIG. 4 is a characteristic diagram showing a noise frequency characteristic when an actual audio signal is passed through the quantizing error reducer of the emboidment, FIG. 5 is a block diagram showing the circuit configuration of a second embodiment according to this invention, FIG. 6 is a block diagram showing the circuit configuration of a third embodiment according to this invention, FIG. 7 is a frequency characteristic diagram for explaining the masking effect, FIG. 8 is a characteristic diagram showing a bark spectrum, FIG. 9 is a frequency characteristic diagram for explaining a masking threshold, FIGS. 10 to 13 are characteristic diagrams showing filter characteristics, respectively, FIG. 14 is a block diagram showing the actual example where the quantizing error reducer of this embodiment is applied to an encoder/decoder system for a compact disc, FIG. 15 is a block diagram showing the actual example where the quantizing error reducer of this embodiment is applied to a 10 bit system, and FIG. 16 is a block diagram showing the actual example where the quantizing error reducer of this embodiment is applied to a D/A conversion system for carrying out oversampling.

DESCRIPTION OF THE PREFERRED EMBODIMENTS

A first embodiment to which this invention is applied will now be described with reference to the attached drawings.

Figure 1:
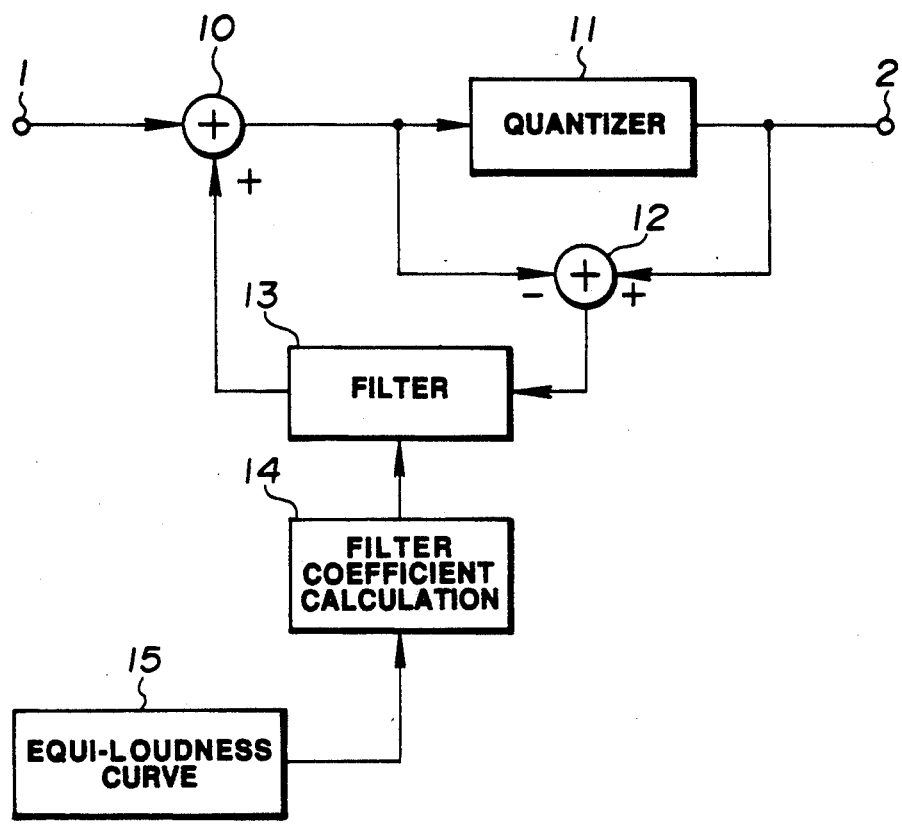

Initially referring to FIG. 1, there is shown, in a block form, the outline of the configuration of a quantizing error reducer for an audio signal of the first emboidment.

Figure 2:
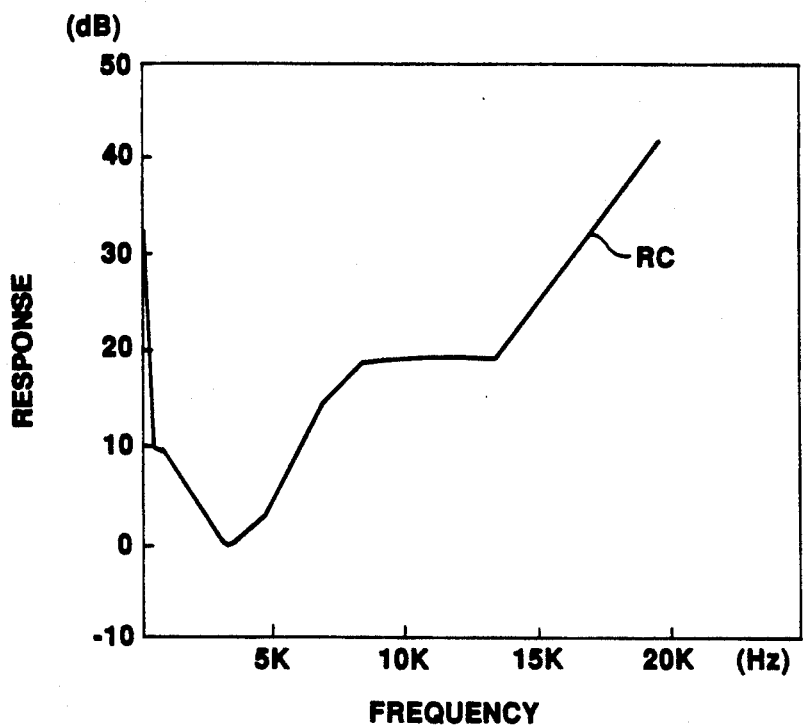

In the quantizing error reducer of the embodiment shown in FIG. 1, a quantizing error generated in a quantizer 11 is fed back to the input side of the quantizer 11 through a noise filter 13. The filter coefficient of the noise filter 13 is set on the basis of information relating to so called an equi-loudness curve RC as shown in FIG. 2 corresponding to the hearing sense characteristic of a human being. Here, a digital audio signal obtained by sampling at an arbitrary sampling frequency is delivered to the input terminal 1 of FIG. 1. The digital audio signal is re-quantized at the quantizer 11, and is outputted from the output terminal 2.

Namely, in the quantizing error reducer of this embodiment, by an adder 12 for subtracting an input to the quantizer 11 from an output from the quantizer 11 to thereby provide a quantizing error generated in quantization at the quantizer 11, a noise filter 13 for applying a filtering processing to an output from the adder 12 to output it, in which a filter characteristic is set by the filter coefficient which will be described later, and an adder 10 for adding an output from the noise filter 13 to an input to the quantizer 11, so called an error feedback circuit is constituted. By this error feedback circuit, the quantizing error reducing effect (so called noise shaping processing) is carried out. Further, the quantizing error reducer of this embodiment includes an equi-loudness curve generation circuit 15 for generating data of an equi-loudness curve RC of FIG. 2 corresponding to a hearing sense characteristic of the human being, and a filter coefficient calculation circuit 14 for calculating the filter coefficient of the noise filter 13 on the basis of an output from the equi-loudness curve generation circuit 15.

Here, the equi-loudness curve RC is a curve corresponding to the hearing sense characteristic of the human being. This curve RC is obtained by connecting, by curve segments, sound pressures of a sound at respective frequencies which can be heard at the same loudness as that of a pure sound of, e.g., 1 KHz, and is also called an equi-sensitivity curve of loudness. In the equiloudness curve RC, as shown in FIG. 2, the hearing ability of the human being is sharp in the vicinity of 4 KHz. Accordingly, even if the sound pressure is lower by 8 to 10 dB than that at 1 KHz, sound can be heard substantially at the same loudness as that at 1 KHz. Conversely, e.g., at 10 KHz, sound is difficult to be heard to an extent of 20 dB than that in the vicinity of 4 KHz.

Information (information of an allowable noise spectrum) relating to the equi-loudness curve RC (or its approximate curve) is outputted from the equi-loudness curve generation circuit 15, and is then sent to the filter coefficient calculation circuit 14. Accordingly, at the filter coefficient calculation circuit 14, a filter coefficient is calculated on the basis of the information relating to the equi-loudness curve RC. The filter coefficient thus calculated is further sent to the noise filter 13. In this way, by carrying out a noise shaping of an audio signal by the error feedback circuit using the noise filter 13 having a filter characteristic based on the information relating to the equi-loudness curve RC, the dynamic range in the hearing sense can be improved. Namely, by carrying out a noise shaping using an allowable noise spectrum (allowable noise level) obtained by taking the equi-loudness curve RC into account, noise shaping more effective in view of the hearing sense is conducted, thus making it possible to improve the dynamic range in the hearing sense of a reproduced sound.

Further, in this embodiment, in determination of the filter characteristic of the noise filter 13, the so called masking effect is taken into consideration. Here, the masking effect is the phenomenon that a signal is masked by another signal by the characteristic in the hearing sense of the human being, so sound cannot be heard. As this masking effect, there are the masking effect with respect to a signal on the time base, and the masking effect with respect to a signal on the frequency base (or the same time masking, the temporal masking). Even if there is a noise in the portion subject to masking, that noise cannot be heard by the masking effect. For this reason, when an approach is employed to carry out a quantizing error reducing processing in which the masking effect is taken into consideration, the dynamic range in the hearing sense can be improved. In order to determine a filter characteristic in which such a masking effect is taken into consideration, a filter coefficient in which, e.g., the masking effect in the direction of the frequency base is taken into consideration is set in advance at the filter coefficient calculation circuit 14 of this embodiment. For example, in order to cope with an ordinary audio sound including many medium and low frequency band components, a fixed filter coefficient in which the masking effect in the low frequency band is taken into consideration is set. Alternatively, in order to have an ability of coping with the masking effect corresponding to a spectrum of an input audio signal, an approach may be employed to generate an adaptive filter coefficient corresponding to the spectrum.

Thus, the filter coefficient from the filter coefficient calculation circuit 14 is provided under the state where the equi-loudness curve RC and the masking effect are taken into consideration. Accordingly, the filter characteristic of the noise filter 13 is set on the basis of the fixed or adaptive filter coefficient in which the masking effect is taken into consideration and the filter coefficient relating to the equi-loudness curve RC.

Figure 3:
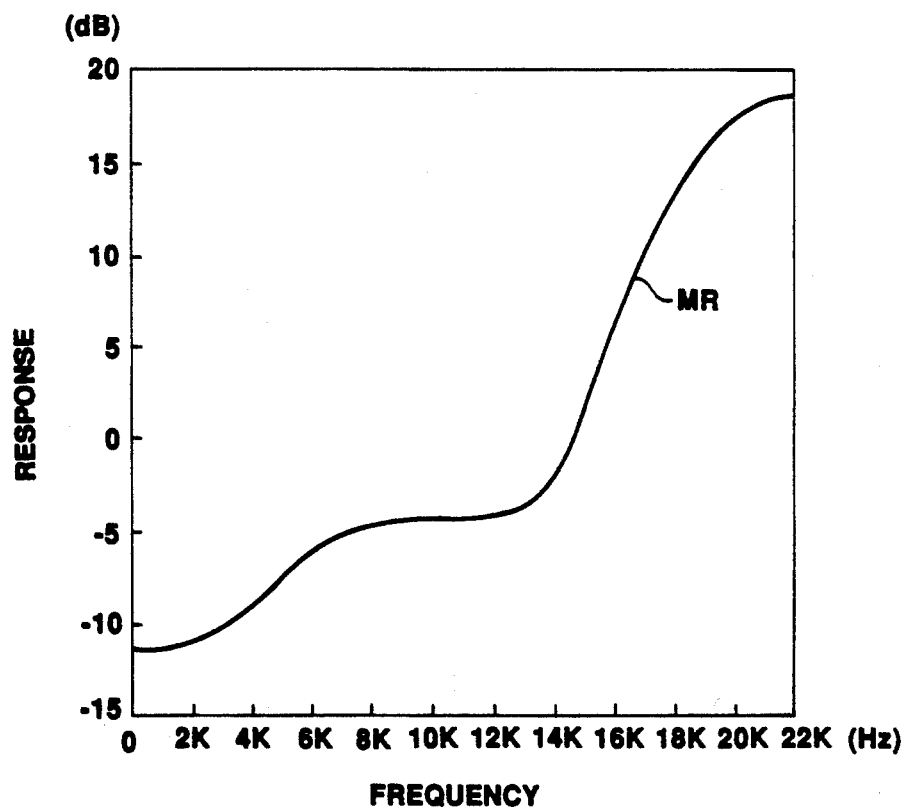
Figure 4:
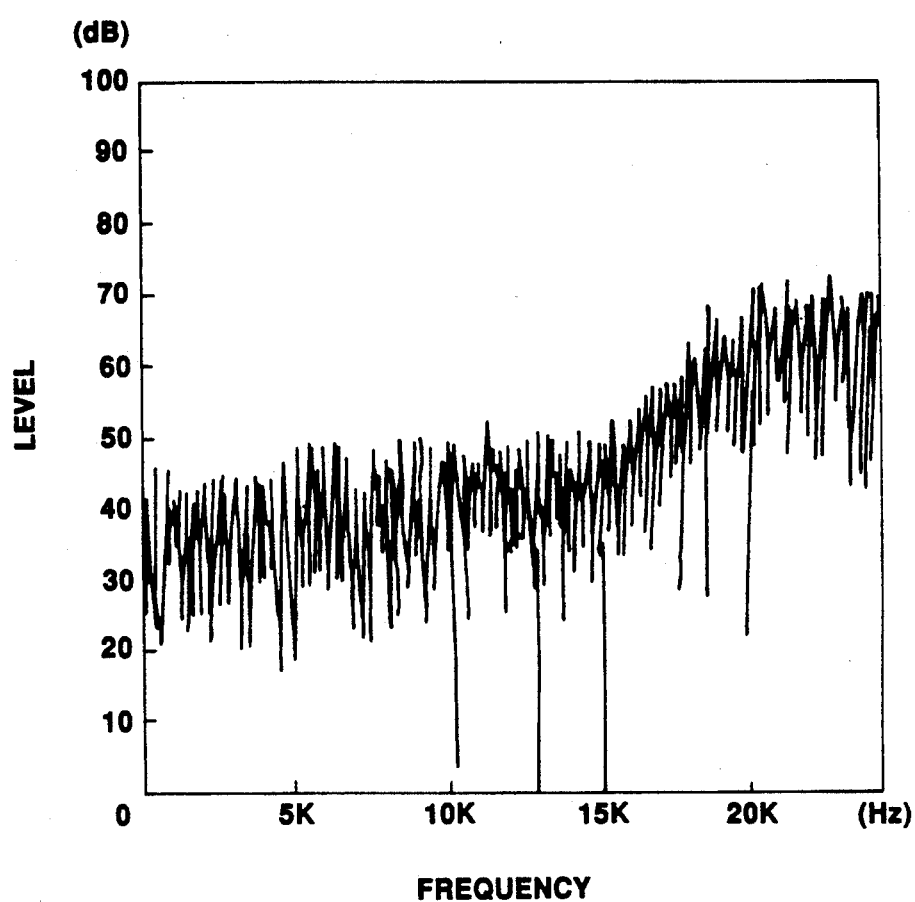
Figure 5:
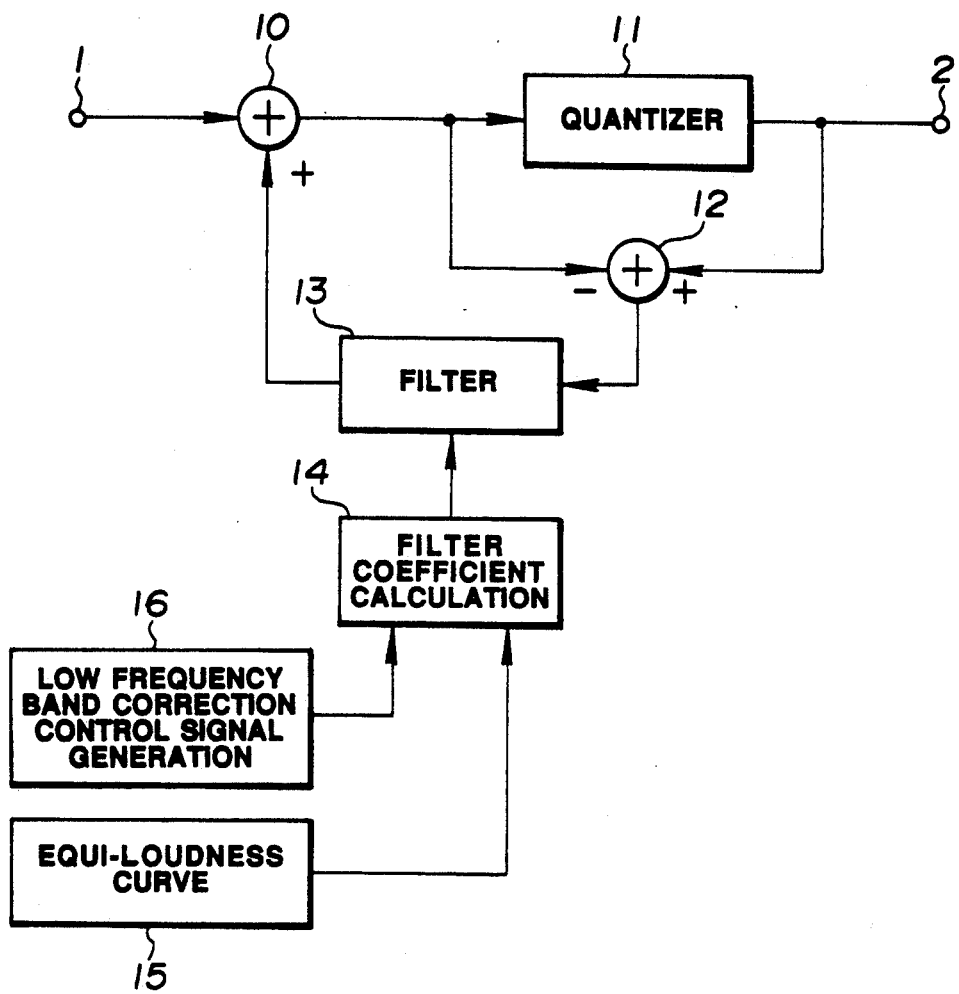

Namely, the noise filter 13 at this time serves as a filter having a filter characteristic as indicated by the curve MR obtained from the masking effect and the equi-loudness curve as shown in FIG. 3. By allowing the noise filter 13 to have the filter characteristic indicated by the curve MR of FIG. 3, a quantizing error spectrum delivered to the noise filter 13 is changed in correspondence with the curve MR. By adding an output from the noise filter 13 to an input audio signal, the quantizing error at the quantizer 11 is reduced (subjected to noise shaping). Here, in the curve MR of FIG. 3, when the equi-loudness curve RC of FIG. 2 is taken into consideration, it is conceivable to increase the response in the frequency band less than 4 KHz (i.e., an approach may be employed to increase allowable noise), but the filter characteristic in the frequency band less than 4 KHz is caused to be flat in a second embodiment which will be described later. The reason why such a scheme is employed is as follows. Namely, since the equi-loudness curve RC varies steeply in the frequency band less than 4 KHz although the bandwidth is not broad, if a noise filter 13 caused to be in correspondence with the equi-loudness curve RC in the frequency band less than 4 KHz is prepared, the degree of the filter is increased. If the degree of the filter is increased as stated above, the configuration becomes complicated and becomes large in scale. However, since the effect corresponding to the scale of the filter is not obtained at this time, the filter characteristic in the frequency band less than 4 KHz is caused to be flat as described above in the second embodiment which will be described below. Namely, FIG. 5 shows the second embodiment of this invention wherein the same reference numerals are respectively attached to blocks corresponding to those of FIG. 1, and their detailed explanation will be omitted. In FIG. 5, there is further provided a low frequency band correction control signal generation circuit 16 wherein a low frequency band correction control signal generated in this circuit is delivered to the filter coefficient calculation circuit 14. Thus, the filter characteristic flat in the low frequency band as indicated by the above-described curve MR of FIG. 3 is realized. Further, this low frequency band correction control signal is assumed to be formed in consideration of the masking effect. Generally, in the medium and high frequency bands frequently used in an ordinary audio sound, the above-mentioned masking effect in the medium and high frequency band of the audio sound is valid. Accordingly, in the noise filter 13 of this embodiment, the response in the curve MR of the filter characteristic of FIG. 3 is not lowered to such an extent that the response in the equi-loudness curve RC of FIG. 2 is lowered (the curve MR is caused to be more gentle than the equi-loudness curve RC). Namely, for the purpose of realizing this, as described above, a filter coefficient in which the masking effect is taken into consideration is set. The frequency characteristic of the quantizing noise obtained when the filter characteristic of the noise filter 13 is set as shown in FIG. 3 to carry out the quantizing noise reducing processing by using an actual audio sound is shown in FIG. 4.

A third embodiment utilizing the masking effect will now be described with reference to FIG. 6. Also in FIG. 6, the same reference numerals are attached to blocks corresponding to those of FIG. 1, respectively.

Figure 6:
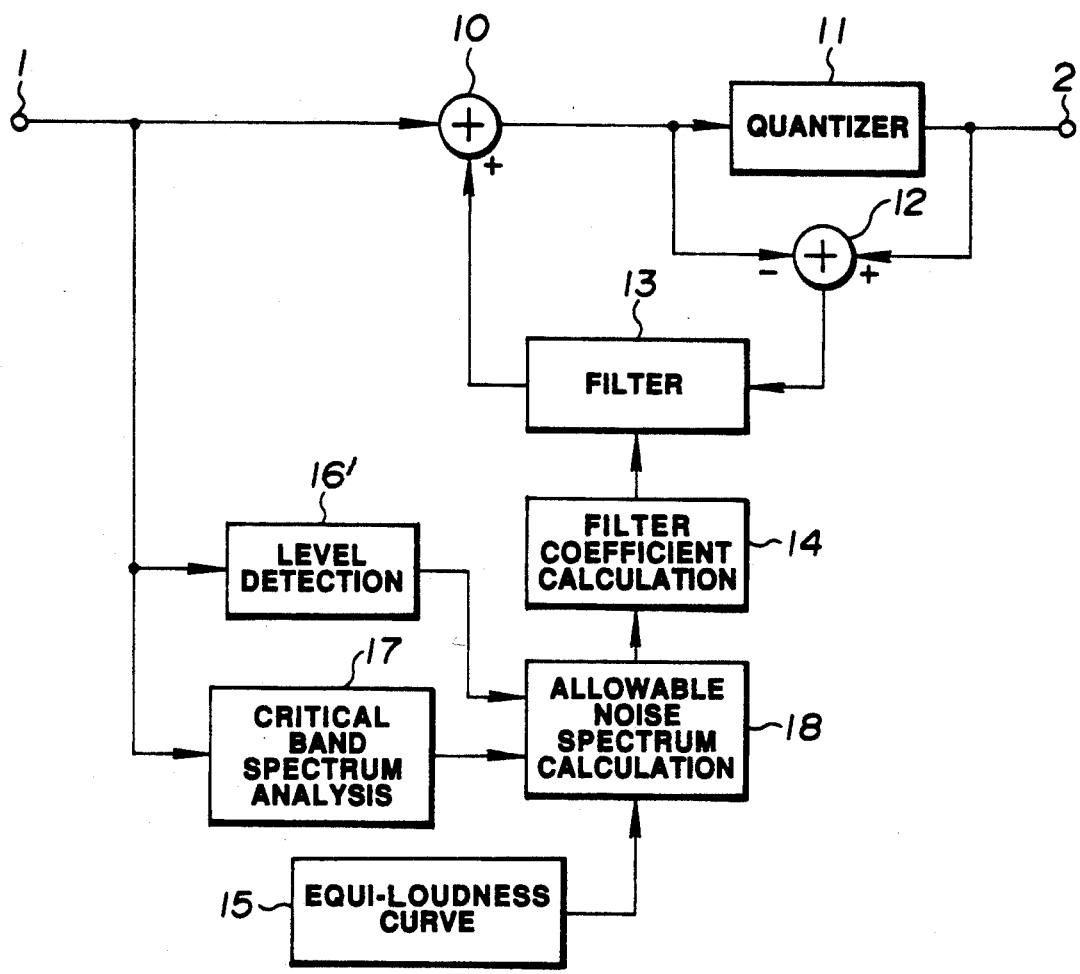

The quantizing noise reducer of this embodiment of FIG. 6 is constructed to feed a quantizing error generated at the quantizer 11 back to the input side of the quantizer 11 through the noise filter 13. More particularly, this quantizing noise reducer comprises a level detector 16' for detecting the level of an input audio signal, a frequency analysis circuit 17 for analyzing the frequency of an input audio signal every critical band, equi-loudness curve generation circuit 15 for generating information based on the so called equi-lpudness curve RC as shown in FIG. 2 corresponding to the hearing sense characteristic of the human being, and an allowable noise spectrum calculation circuit 18 for changing the synthetic ratio between an output from the frequency analysis circuit 17 and an output from the equi-loudness curve generation circuit 15 to calculate an allowable noise spectrum on the basis of the synthetic information obtained. In this quantizing noise reducer, the filter characteristic of the noise filter 13 is set on the basis of output information from the allowable noise spectrum calculation circuit 18.

Namely, in the quantizing error reducer of this embodiment, by the adder 12 for subtracting an input to the quantizer 11 from an output from the quantizer 11 to thereby provide a quantizing error generated in quantization at the quantizer 11, the noise filter 13 for applying filtering processing to an output from the adder 12 to output it, and the adder 10 for adding an output from the noise filter 13 to an input to the quantizer 11, the so called error-feedback circuit is constituted. Here, the filter characteristic of the noise filter 13 is determined as follows. In actual terms, an approach is employed to calculate, by the filter coefficient calculation circuit 14, a filter coefficient based on information of an allowable noise spectrum which will be described of the allowable noise spectrum calculation circuit 18 to send this filter coefficient information to the noise filter 13. Accordingly, in the above-mentioned error feedback circuit, a quantizing error reducing processing (so called noise shaping processing) based on the allowable noise spectrum which will be described is carried out. A signal thus processed is then outputted from the output terminal 2.

Figure 7:
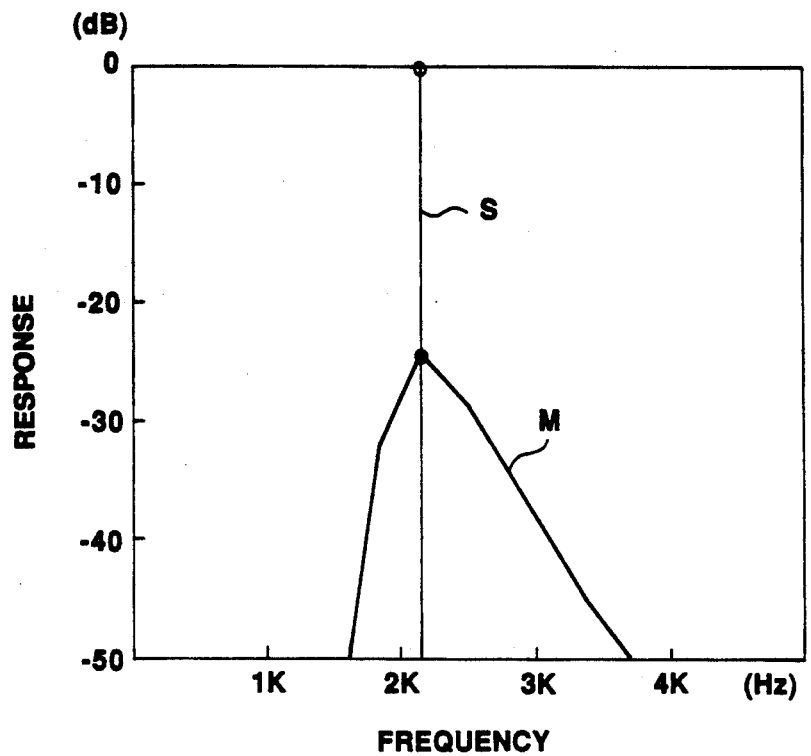

Meanwhile, in carrying out the quantizing error reducing processing (noise shaping processing) of an audio signal by using the above-mentioned error feedback circuit, by carrying out a processing in which so called masking of the input signal spectrum is taken into account, the dynamic range in the hearing sense can be improved. As the noise shaping in which the masking is taken into consideration, there may be enumerated, e.g., a noise shaping corresponding to a spectrum of an input audio signal in which the pattern of a signal spectrum is fixed to some extent, i.e., a noise shaping using an allowable noise spectrum obtained in consideration of so called masking which will be described later of an input audio signal spectrum. Alternatively, there is enumerated a noise shaping using an allowable noise spectrum adaptive with respect to changes in the spectrum of an input audio signal obtained in consideration of the masking of the spectrum, or the like. Here, the masking is the phenomenon that a signal is masked by another signal by the characteristic in the hearing sense of the human being, so sound is not heard. As the masking effect, there are the masking effect with respect to a signal on the time base and the masking effect with respect to a signal on the frequency base (or the same time masking, temporal masking). Even if there is a noise at the portion subjected to masking, that noise is difficult to be heard by the masking effect. For example, as the same time masking effect, as shown in FIG. 7, when the frequency response of the signal S having a certain frequency is assumed to be 0 dB, the masking effect is exerted on the response lower than that of the curve M (less than about $-25$ dB) by the above-mentioned signal S.

Further, when an approach is employed to band-divide an input signal at the critical band by making use of the hearing sense characteristic of the human being to carry out noise shaping, every band, by using an allowable noise spectrum in which the masking as described above is taken into consideration, noise shaping more effective in the hearing sense can be carried out. By carrying out such a noise shaping, the dynamic range in the hearing sense of a reproduced sound can be improved.

Figure 8:
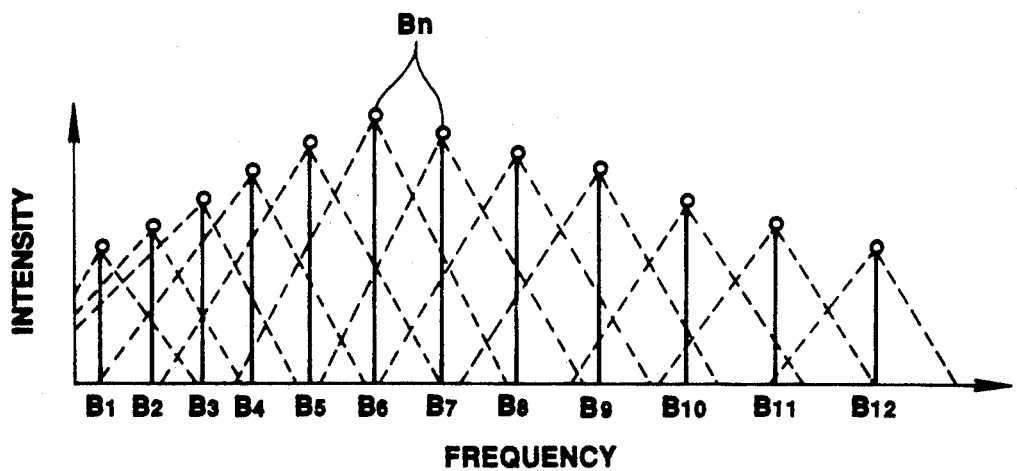

In view of this, in the frequency analysis circuit 17, an approach is employed to divide the above-mentioned audio signal into so called critical bands by making use of the hearing sense characteristic of the human being to carry out a frequency analysis every critical band. As the division at the above-mentioned critical band at this time, e.g., an approach may be employed to transform, e.g., by Fast Fourier Transformation (FFT), an input audio signal into the components on the frequency base thereafter to divide (band-divide) the amplitude term Am (m=0 to 1024) of the FFT coefficient into, e.g., groups Gn of 25 bands (n represents the number of respective bands, n=0 to 24) at the above-mentioned critical band having a broader bandwidth in the higher frequency band in which the hearing sense characteristic of the human being is taken into consideration. Further, as the frequency analysis every respective critical bands, there may be carried out such an analysis to determine a bark spectrum (spectrum of sum total) Bn obtained by taking a sum total (the sum total of peak, average or energy of the amplitude term Am) of respective amplitude terms Am every band, e.g., by the following equation (1):

$$Bn = 10 \log_{10} Cn(Pn)^2 \, [dB] \tag{1}$$

where n is 0 to 24, and Cn is the number of elements in the n-th band, i.e.. the amplitude term (the number of points), and Pn is a peak value in each band. Bark spectra Bn of respective bands are, e.g., as shown in FIG. 8. It is to be noted that, in the example of FIG. 8, for the brevity of illustration, the number of all the bands in the critical band is represented, e.g., with 12 bands ($B_1$ to $B_{12}$) In the frequency analysis circuit 17, division at the critical band and the frequency analysis every bands as described above are carried out. Its output information is sent to the allowable noise spectrum calculation circuit 18.

From the equi-loudness curve generation circuit 15, information of the equi-loudness curve RC is generated and outputted. Namely, by carrying out a noise shaping using an allowable noise spectrum obtained in consideration of the equi-loudness curve RC, noise shaping more effective in the hearing sense is conducted. Thus, the dynamic range in the hearing sense of a reproduced sound can be improved. Information of the equi-loudness curve RC (or its approximate curve) is outputted from the equi-loudness curve generation circuit 15, and is sent to the allowable noise spectrum calculation circuit 18.

Accordingly, in the allowable noise spectrum calculation circuit 18, the allowable noise spectrum is calculated on the basis of output information from the above-described equi-loudness curve generation circuit 15 and output information from the frequency analysis circuit 17. At this time, from the bark spectrum Bn every critical band at the frequency analysis circuit 17, by carrying out convolution (convoluting a predetermined weight function) in consideration of the influence between bands by using the following equation (2), the bark spectrum Sn convoluted every band is calculated.

$$Sn = Hn*Bn \tag{2}$$

where Hn is the coefficient of convolution. By this convolution, the sum total of the portions indicated by the dotted lines in FIG. 8 is provided. Further, by using the convoluted bark spectrum Sn and On (n=0 to 24) which is a S/N value required, a convoluted masking threshold Tn is calculated in accordance with the followiwng equations (3) and (4).

$$On = N - K \times n \tag{3}$$

$$Tn = Sn - On \tag{4}$$

Figure 9:
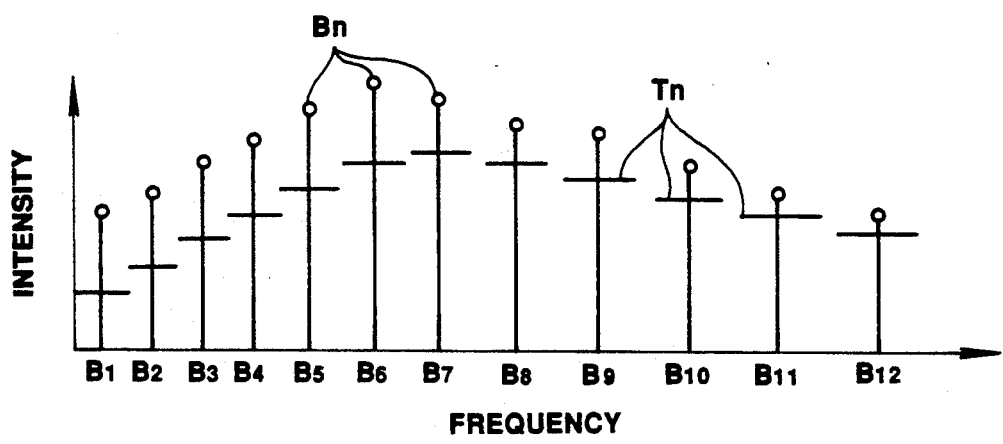

For example, when N is assumed to be 38, K is permitted to be equal to 1. There results less degradation of sound quality at this time. Namely, as shown in FIG. 9, sound intensity values less than respective levels of the convoluted masking thresholds Tn are masked. Thereafter, by deconvoluting the convoluted masking threshold Tn by using the following equation (5), an allowable noise level (allowable noise spectrum) TFn is calculated. Actually, DC gain Dn of the convolution, e.g., by the coefficient Hn is subtracted.

$$TFn = Tn - Dn \tag{5}$$

In the allowable noise spectrum calculation circuit 18, the allowable noise spectrum is calculated on the basis of synthetic information obtained by synthesizing output information from the frequency analysis circuit 17 obtained as described above and output information from the previously described equi-loudness curve generation circuit 15.

Here, there are instances where the allowable noise level at the allowable noise spectrum based on the equi-loudness curve RC may be less than the allowable noise level where the masking effect is exerted by the level of an input audio signal. Namely, for example, in the case where the level of an input audio signal is high, the level of the allowable noise spectrum based on the equi-loudness curve may be also masked at the same time by the allowable noise level where the masking effect by the input audio signal is exerted.

In view of the above, in this embodiment, an approach is employed to detect the level of the input audio signal at the level detector 16 to vary, on the basis of the level detected output, the synthetic ratio between output information from the equi-loudness curve generation circuit 15 and output information from the frequency analysis circuit 17. Here, synthesis of output information of the equi-loudness curve generation circuit 15 and the frequency analysis circuit 17 is carried out, e.g., every frequency band. In this case, the level detection at the level detector 16 is carried out every band. Accordingly, the synthetic ratio can be changed every band on the basis of level detected outputs every band. Namely, with respect to synthetic information for determining an allowable noise spectrum in the allowable noise spectrum calculation circuit 18, for example, in the case where the level in a low frequency band of an input audio signal is high and the masking effect in the low frequency band is great, synthetic information is prepared at a synthetic ratio such that an allowable noise spectrum having a high level in the low frequency band and a low level in the high frequency band is provided. In contrast, for example, in the case where the level in a high frequency band is high and the masking effect in the high frequency band is great, synthetic information is prepared at a synthetic ratio such that an allowable noise spectrum having a high level in the high frequency band and a low level in the low frequency band is provided. Information of the allowable noise spectrum thus provided is sent to the filter coefficient calculation circuit 14. Thus, a filter coefficient corresponding to the allowable noise spectrum is outputted from the filter coefficient calculation circuit 14, and is then sent to the noise filter 13.

Figure 10:
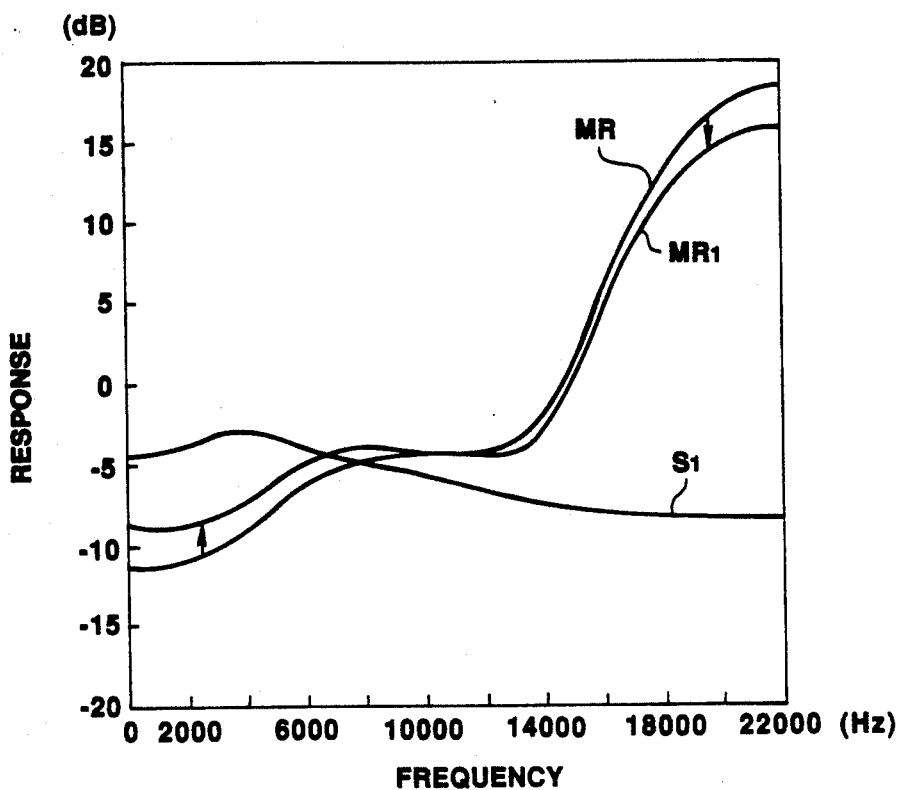
Figure 11:
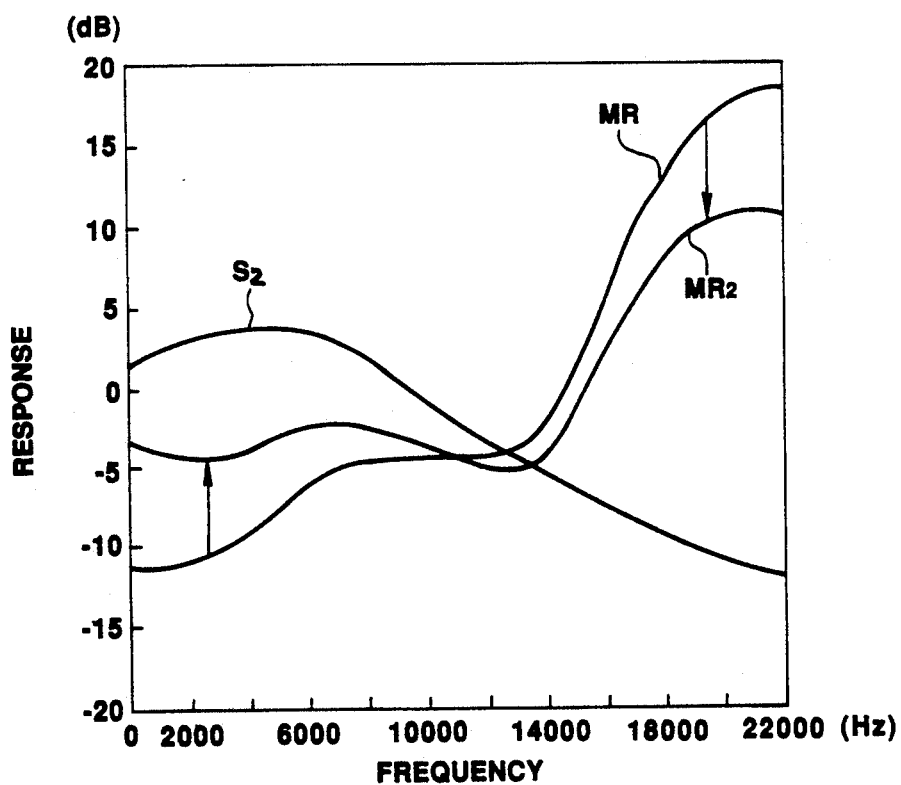
Figure 12:
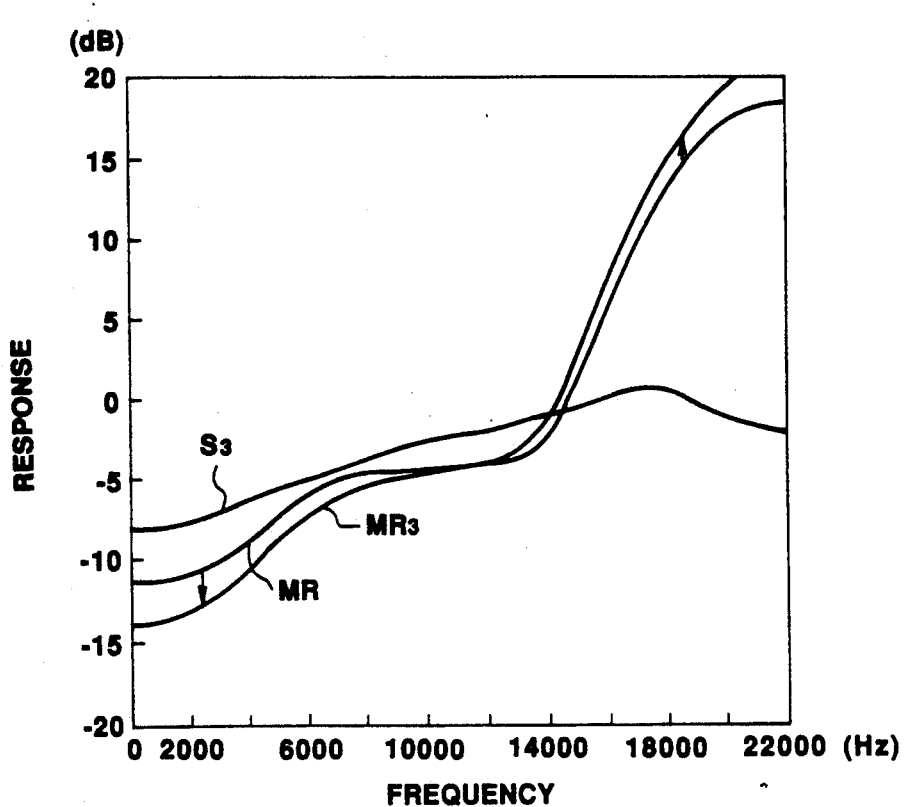
Figure 13:
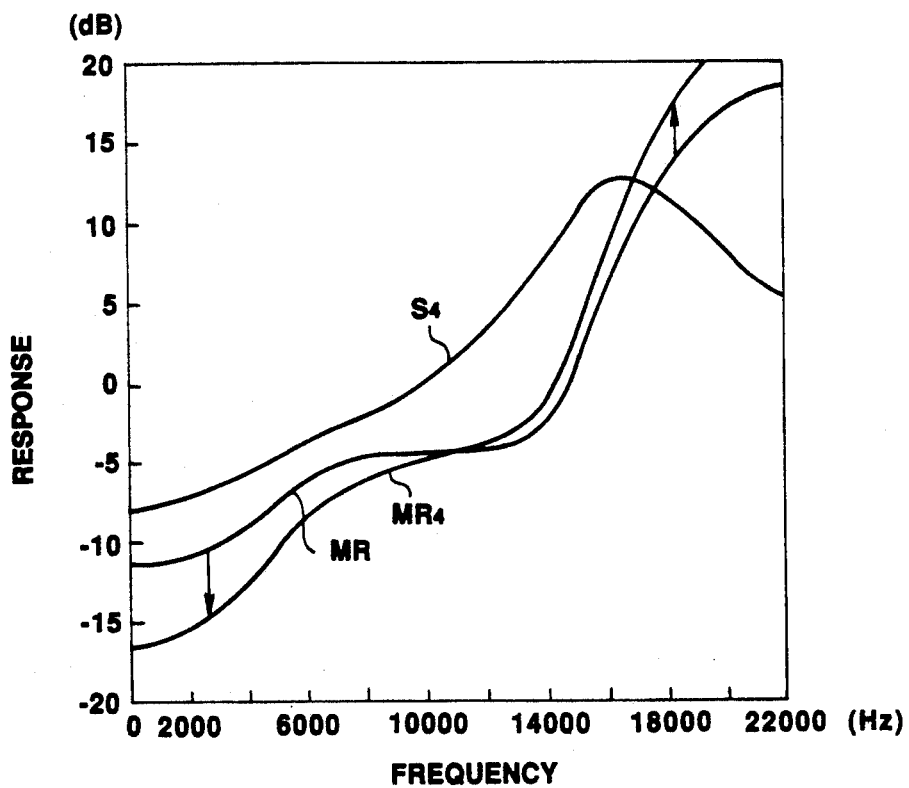

Since the approach described above is employed, the filter characteristic of the noise filter 13 is caused to be in correspondence with the filter coefficient based on an allowable noise spectrum obtained by varying a synthetic ratio every band in dependency upon the level of an input audio signal. Here, for example, in the case where the level of the input audio signal is flat, the filter characteristic of the noise filter 13 is assumed to be indicated by the curve MR of FIGS. 10 to 13. At this time, in the case where the input audio signal is a signal having a slightly high level in the low frequency band as shown in FIG. 10, because the synthetic ratio can be varied as described above, the filter characteristic can be changed to the characteristic as indicated by the curve $MR_1$ in FIG. 10 in which the level of the curve MR in the low frequency band is slightly raised and the level thereof in the high frequency band is slightly lowered. Further, for example, in the case where the input audio signal is a signal $S_2$ having a large level in the low frequency band as shown in FIG. 11, the filter characteristic of the noise filter 13 is changed to the characteristic as indicated by the curve $MR_2$ in FIG. 11 in which the level of the curve MR in the low frequency band is raised to a much higher degree and the level thereof in the high frequency band is lowered to a much lower degree. In contrast, in the case where the input audio signal is a signal $S_3$ having a slightly large level in the high frequency band as indicated by FIG. 12, the filter characteristic is changed to the characteristic as indicated by the curve $MR_3$ in FIG. 12 in which the level of the curve MR in the low frequency band is slightly lowered and the level thereof in the high frequency band is slightly raised. Further, for example, in the case where the input audio signal is a signal $S_4$ having a high level in the high frequency band as shown in FIG. 13, the filter characteristic is changed to the characteristic as indicated by the curve $MR_4$ in FIG. 13 in which the level of the curve MR in the low frequency band is lowered to much degree and the level thereof in the high frequency band is raised to much degree. As the result of the fact that the filter characteristic is changed as shown in FIGS. 10 to 13, noise shaping more properly adapted to the hearing sense characteristic of the human being can be carried out.

Namely, in the quantizing noise reducer of this embodiment, when the level of an input audio signal is small, the filter characteristic of the noise filter 13 is caused to be the characteristic as indicated by the equi-loudness curve RC to carry out noise shaping. Further, in order to allow the quantizing level not to be conspicuous by the level of the input audio signal according as the signal level becomes large, the characteristic of the noise filter 13 is caused to be flat in correspondence with the signal level of the input audio signal. In addition, when the signal level is small, the characteristic as indicated by the equi-loudness curve RC is caused to become closer to a flat characteristic in correspondence with the signal level by the noise filter 13 to change it to a noise shaping characteristic (masking characteristic, etc.) caused to be in correspondence with the signal characteristic. Namely, when the signal level is small, the characteristic of the noise filter 13 is caused to be a filter characteristic as indicated by the equi-loudness curve RC, while when the signal level is large, the characteristic of the noise filter 13 is caused to be the filter characteristic in which the masking effect is taken into consideration.

In the curve MR showing the filter characteristic when the level of the input audio signal of FIGS. 10 to 13 is flat, if the previously described equi-loudness curve RC of FIG. 4 is taken into consideration, a scheme is conceivable to raise the level less than 4 KHz (i.e., an approach may be employed to increase allowable noise). However, since the equi loudness curve RC steeply changes in the frequency band less than 4 KHz although the bandwidth is not broad, if a noise filter 13 in conformity with the equi-loudness curve RC in the frequency band less than 4 KHz is prepared, the degree of the filter is increased. When the degree of the filter is increased, the configuration becomes complicated and becomes large in scale. However, since the effect corresponding to the scale of the filter cannot be provided, also in this embodiment, the filter characteristic in the frequency band less than less than 4 KHz is caused to be flat as described above in the same manner as in the second embodiment of FIG. 5. Further, in the noise filter 13 of this embodiment, since the masking effect in the medium and high frequency bands frequently used of an audio sound is ordinarily valid, an approach is employed not to lower the level of the curve MR of FIGS. 10 to 13 to an extent of the equi-loudness curve RC of FIG. 4 (The curve MR is caused to be more gentle than the equi-loudness curve RC). Namely, to realize this, as described above, the filter coefficient in which the masking effect is taken into consideration is set.

Figure 14:
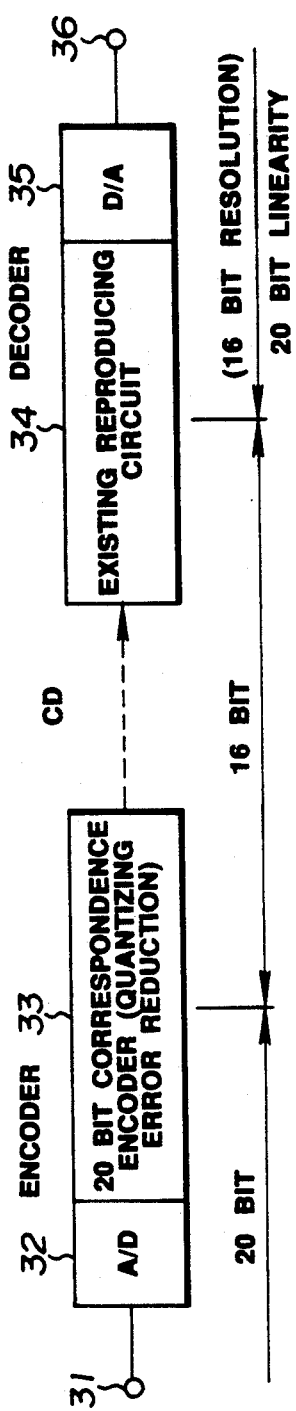

The actual example of the system configuration where the quantizing error reducer of this embodiment is used as the encoder/decoder system in, e.g., so called compact disk (CD) is shown in FIG. 14. In FIG. 14, an analog audio signal is delivered to the input terminal 31. After this analog audio signal is converted to a 20 bit digital signal at an A/D converter 32, it is sent to a 20 bit correspondence encoder 33 including therein the quantizing error reducer of this embodiment. At the encoder 33, that digital data undergoes the quantizing error reducing processing and is encoded into data of 16 bits. The data thus processed is recorded onto the CD. The data recorded on the CD is converted to an audio signal at a reproducing circuit 34 and a D/A converter 35 of the existing CD player, and is outputted from the output terminal 36. The data thus outputted is then reproduced. Namely, since the data recorded on the CD is such that the quantizing error is reduced by the quantizing error reducer of this embodiment, sound obtained by playing back the CD has a high dynamic range in the hearing sense.

Figure 15:
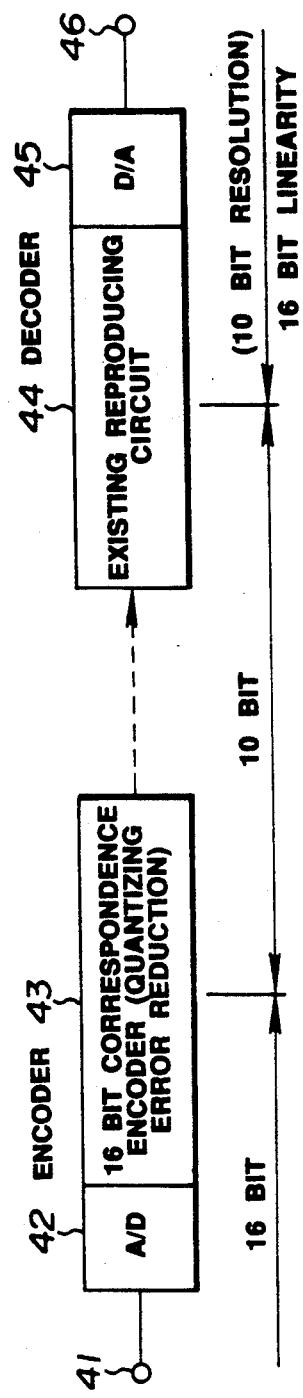

Further, the actual example of the system configuration using e.g., a medium for recording data by using 10 bits different from the above-mentioned CD is shown in FIG. 15. In this case, an analog signal inputted and delivered to the input terminal 41 is converted to, e.g., a 16 bit digital data at for an A/D converter 42. The signal thus obtained is sent to a 10 bit correspondence encoder 43 including therein the quantizing error reducer of this embodiment. At the encoder 43, the digital data undergoes the quantizing error reducing processing and is encoded into 10 bit data. The data thus processed is recorded onto the medium. The data recorded on the medium is converted to an analog signal at a reproducing circuit 44 and a D/A converter 45 of the existing player, and is outputted from the output terminal 46. Also in this case, a reproduced signal obtained has a high dynamic range.

Figure 16:
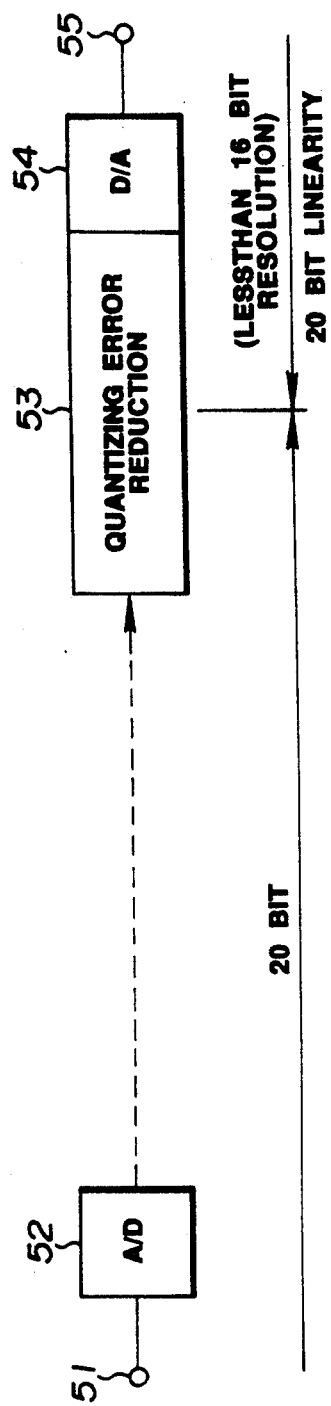

The actual example where the quantizing error reducer of this embodiment is used in the D/A conversion system for carrying out oversampling is shown in FIG. 16. In this case, an analog signal inputted and delivered to the input terminal 51 is converted to, e.g., digital data of 20 bits at an A/D converter 52 for carrying out oversampling, and is sent to a quantizing error reducer 53 of this embodiment through a transmission path. At this quantizing error reducer 53, that digital data undergoes the quantizing error reducing processing. The digital data thus processed is converted to an analog signal through a D/A converter 54, and is outputted from the output terminal 55. Thus, oversampling is permitted to be carried out and the resolution of the D/A converter is permitted to be lowered. Thus, the D/A converter 54 having a high linearlity can be easily prepared.

That is claimed is:

1. A quantizing noise reducer for an audio signal comprising:

quantizing means for quantizing an input audio signal, subtracter means for subtracting an input signal to said quantizing means from an output signal from said quantizing means, filter means supplied with an output from said subtractor means, means for synthesizing an output from said filter means and said input audio signal, and filter control means for controlling a characteristic of said filter means, and including filter coefficient calculating means and data generating means for generating data relating to an equi-loudness characteristic, said data being supplied to said filter coefficient calculating means.

2. A quantizing noise reducer according to claim 1, wherein said filter control means further includes means for generating control data for correcting a lower frequency band portion of said filter characteristic.

3. A quantizing noise reducer according to claim 1, wherein said filter control means further includes means for controlling said filter characteristic in accordance with a masking effect of said input audio signal.

4. A quantizing noise reducer according to claim 3, wherein said filter control means include a control to present a filter characteristic to realize a noise shaping such that an allowable noise spectrum obtained in consideration of the masking effect is provided in accordance with said input audio signal.

5. A quantizing noise reducer according to claim 3, wherein said filter control means includes a control to present a filter characteristic to realize a noise shaping such that an allowable noise spectrum in which the equi-loudness curve is taken into consideration when the signal level of said input audio signal is small, and the masking effect is taken into consideration as the signal level thereof becomes large is provided.

* * * * *